UNITED STATES PATENT OFFICE.

JOHN E. FURBER, OF LAWRENCE, MASSACHUSETTS.

SUBSTITUTE FOR WHITE OF EGGS.

SPECIFICATION forming part of Letters Patent No. 458,419, dated August 25, 1891.

Application filed March 4, 1891. Serial No. 383,736. (No specimens.)

*To all whom it may concern:*

Be it known that I, JOHN E. FURBER, a citizen of the United States, residing at Lawrence, in the county of Essex and State of Massachusetts, have invented certain new and useful Improvements in Artificial Egg-Food; and I do hereby declare the following to be a full, clear, and exact description of the invention, such as will enable others skilled in the art to which it appertains to make and use the same.

This invention relates to the artificial production of the white of an egg.

The object of my invention is to produce a substance which is to be in powder form for the purposes of easy packing and long preservation, while at the same time by the addition of a small amount of liquid the chemical equivalent of the white of an egg with all its attributes can be readily produced for cooking or other purposes.

The analysis of the egg of a fowl shows that the white contains water, albumen, and mineral matter in certain well-known proportions. To produce the white of an egg artificially and yet obtain it as a dry powdered substance, I take either egg-albumen, vegetable-albumen, or blood-albumen in a dry form. If blood-albumen is used, then sulphur and phosphates must be added separately, since egg-albumen in a dry state contains both these ingredients. To this dry albumen is added mineral matter in the form of chloride of sodium and bicarbonate of soda, while to give the product the peculiar properties which enable the white of an egg to be beaten to a stiff froth I add corn-starch and dextrine. Both these substances give it consistence, but the latter, being soluble in water, while the corn-starch is not, is peculiarly adapted to cause the solution to froth.

As regards the introduction of albuminous matter, either vegetable or animal, any nitrogenous organic matter of an albuminous nature may be used in the proportion as exists in the white of an egg—viz., twelve per cent., (12%.) If the albumen be of a vegetable nature, I seek to make it soluble—namely, soluble in water—the mineral and organic matter to be (from whatever source obtained) in the proportions of the white of an egg. If egg-albumen is used dry, there is a deficiency of three constituents—viz., water, sodium carbonate, and sodium chloride. Furthermore, upon evaporation of white of an egg to obtain dry albumen, if the heat to obtain it be excessive, there is a destruction of albumen to a certain extent, (usually the case,) and in consequence the product is not the same as white of egg. If white of egg (dry albumen) is used and any portion is found to be insoluble, I separate the insoluble from the soluble albumen, in order to obtain albumen completely soluble.

I have alluded to the use of blood-albumen, when the elements sulphur and phosphates, then lacking, must be added and in the same proportion that exists in the white of an egg—sulphur six one-hundredths per cent., (.06%,) phosphates seventy-eight one-hundredths per cent. (.78%.) The sulphur exists in the form of sulphates of magnesium, sodium, potash, and lime, which lime, soda, and potash are oxides of the metals calcium, sodium, and potassium, together with sulphuric acid, in combination with the above-named bases. The phosphates exist, principally, as calcium phosphate, (phosphate of lime,) which phosphate of lime is a combination of phosphoric acid ($PO_5$) tribasic with the oxide of the metal calcium. The above-mentioned ingredients, when properly mixed and in suitable proportions, produce a dry powder, which, as before premised, resembles very closely in every respect the white of an egg.

To produce fifty pounds, or thereabout, of this powder, I compound as follows: twenty pounds of corn-starch, twenty pounds of dextrine, eight pounds and three ounces of dry albumen, two and one-quarter ounces of bicarbonate of soda, and one and one-half ounces of chloride of sodium.

I do not desire to be limited to the precise proportions as above declared, since they may be varied and yet produce substantially the same result. This powder, when so compounded, may be packed in small tight boxes, cans, or other convenient form of package and preserved for a long time in readiness for immediate use.

When desired for use, one table-spoonful of liquid, either water or milk, is added to one tea-spoonful of the powder. This solution, when thoroughly mixed, possesses all the peculiar characteristics of the white of an egg. It is obvious that a product of this nature is eminently desirable for culinary purposes, since it is always sweet and fresh, and avoids the use of an egg, where frequently only the white is available and the yelk not desired.

What I claim is—

1. As a new article of manufacture, a powder composed of dry albumen, corn-starch, dextrine, bicarbonate of soda, and chloride of sodium, in the proportions substantially as and for the purposes set forth.

2. As a new article of manufacture, a powder consisting of soluble vegetable or animal albumen, corn-starch, dextrine, bicarbonate of soda, and chloride of sodium, together with sulphur and phosphates, the latter in the same proportions that exist in an egg, substantially as set forth.

In testimony whereof I affix my signature in presence of two witnesses.

JOHN E. FURBER.

Witnesses:
WILBUR E. ROWELL,
ELBRIDGE K. KENT.